United States Patent
Sego, Jr.

(10) Patent No.: US 6,382,564 B1
(45) Date of Patent: May 7, 2002

(54) FLEXIBLE LINKAGE SYSTEM FOR ENVIRONMENTALLY SEALED PARACHUTES AND OTHER SAFETY DEVICES

(75) Inventor: Kenneth W. Sego, Jr., Irvine, CA (US)

(73) Assignee: Simula, Inc., Phoenix, AZ (US)

( * ) Notice: Subject to any disclaimer, the term of this patent is extended or adjusted under 35 U.S.C. 154(b) by 0 days.

(21) Appl. No.: 09/667,678

(22) Filed: Sep. 22, 2000

(51) Int. Cl.[7] .............................................. B64D 17/30

(52) U.S. Cl. ................ 244/151 A; 244/147; 244/151 R (58) Field of Search ............................... 244/137.3, 142, 244/145, 147, 148, 149, 151 R, 151 A, 151 B, 152; 206/524.8; 119/792, 795, 797

(56) References Cited

U.S. PATENT DOCUMENTS 5,253,826 A    10/1993  Coltman et al.
6,056,242 A     5/2000  Collins

OTHER PUBLICATIONS

"Skydiving Equipment . . . and How it Works", The Skydiver's Handbook, Dan Poynter & Mike Turoff, 1998.

The Parachute Manual, A Technical Treatise on Aerodynamic Decelerators, vol. II, Dan Poynter, 1991.

Department of Defense Joint Service Specification Guide, Deployable Aerodynamic Decelerator (DAD) Systems Handbook, 1998.

*Primary Examiner*—Peter M. Poon
*Assistant Examiner*—Gabriel Sukman
(74) *Attorney, Agent, or Firm*—Shaw Pittman LLP (57) ABSTRACT

A flexible linkage system for connecting an environmentally sealed apparatus such as a parachute system to an external apparatus such as a parachute harness, the system comprising an internal link and an external link. The internal link is completely within the sealing packaging and is directly attached to the sealed apparatus. The internal link has a looped end wherein the sealing packaging is sealed around the internal link and joined in the center of the loop. A portion of the sealing is cut away from the center of the loop, thereby forming a void surrounded by the loop and the sealing material. The external link comprises a loop and a connecting hardware anchored to the external link. The loop in the external link is threaded through the center of the loop in the inner link and then it is connected to the connecting hardware.

37 Claims, 7 Drawing Sheets

FLEXIBLE LINKAGE SYSTEM FOR ENVIRONMENTALLY SEALED PARACHUTES AND OTHER SAFETY DEVICES

BACKGROUND

1. Field of the Invention

The present invention relates to parachute systems that are environmentally sealed to extend the parachute's repack cycle and overall useful life. More specifically, the present invention relates to an improved linkage system coupling the external parachute harness to the parachute risers, which are enclosed within the environmentally sealed bag protecting the parachute system.

2. Background of the Invention

Parachute systems typically comprise a harness, a container, a pilot parachute (pilotchute) or a drogue parachute, and a main parachute. Typically a parachute has multiple suspension lines joining the main parachute, i.e., the sail or canopy, to one of two risers which are connected to the harness worn by the parachutist. The connection between the harness and the risers must bear the load of any forces reacting between the parachute and parachutist. The main parachute is packed in a deployment bag with the suspension lines folded and loosely tacked to the outside of the bag. The deployment bag and suspension lines are housed in the parachute container which may form part of the parachute harness. The pilotchute is attached to the deployment bag and may also be stored in the parachute container.

During normal operations, when the parachutist pulls a ripcord or some other means for deploying the parachute is activated, the pilotchute is released into the air stream. The pilot chute pulls the deployment bag out of the parachute container, thereby extending the suspension lines and risers. Eventually, the deployment bag opens releasing the main parachute, and the parachutist's weight will be supported by the main parachute through the risers and suspension lines.

Details on the current state-of-the-art of U.S.-manufactured personnel parachutes, their materials, design, construction, repair, and packing may be found in The Parachute Manual, a Technical Treatise on Aerodynamic Decelerators, by Daniel F. Poynter, Para Publishing, P.O. Box 4232, Santa Barbara, Calif. 93103-0232 (1984), which is expressly incorporated by reference herein. U.S. military specifications for personnel parachutes are presented in Military Specification MIL-P-85710(AS), Parachutes, Personnel, Emergency Escape, General Design Specification for, Department of Defense, Washington, D.C. 20301, Mar. 5, 1986, which is also expressly incorporated by reference herein.

It is known in the art that the life of a parachute system is increased significantly if the parachute is environmentally sealed. The environmentally sealed package protects the parachute from harmful environmental agents such as moisture, mildew, fungus, ultraviolet light, and smog. Environmental sealing typically comprises enclosing the parachute deployment bag (storing the main parachute), the suspension lines and the risers within a vacuum-sealed package ("vacuum bag") made of an environmental barrier material, thereby protecting those components from exposure. Even though the risers are enclosed in the sealed package, they must still be connected to the parachutist's harness, which is external to the environmental envelope, so that there is a structurally sound connection between the parachute system and the parachutist. U.S. Pat. No. 5,253,826 discloses a sealed parachute and a linkage system for joining the risers to the harness without breaking the environmental seal. U.S. Pat. No. 5,253,826 is expressly incorporated by reference herein.

Even when a parachute system has been environmentally sealed, the life of the parachute will be shortened if the integrity of the seal is not maintained. A common problem experienced with conventional parachutes having such sealing or packaging is damage or fatigue in the area where the sealed parachute risers structurally interfaces with the parachute harness. In the prior art, the sealed risers are connected to the harness via a linkage system made of structural metal connectors and a bushing, as described in U.S. Pat. No. 5,253,826. This linkage system provides a rigid connection between the two parachute components, which causes external bending, compression, and tension forces on the linkage to be transmitted to the environmental envelope. This causes the package to fatigue and then leak, thus breaching the environmental seal.

A need therefore exists for an improved linkage system for connecting an environmentally sealed parachute system to a parachute harness system wherein said linkage system does not transfer certain forces from outside of the sealed envelope to components inside the seal.

SUMMARY OF THE INVENTION

The present invention is a flexible linkage system providing a structurally sound connection between an environmentally sealed apparatus, such as a parachute, and an external apparatus, such as a parachute harness. The flexible linkage system comprises a flexible internal riser link, housed completely within the environmentally sealed parachute bag, and a flexible external riser link attached to the harness. The internal and external riser links, when connected together, provide a structural path to support the loads placed on the system upon opening of the parachute. Both the internal riser link and the external riser link can be made of fabricated textile materials providing significant flexibility that prevents bending and fatigue of the environmental or vacuum package. Such textile material should have high strength and low tenacity providing sufficient flexibility without being susceptible to damage.

The internal riser link is attached at one end to the parachute's suspension lines. On the other end a loop is formed. The environmental envelope completely encloses the parachute, including the internal riser link. The loop must be large enough to allow the sealing material to be sealed in the center of the loop with enough space to allow a hole, centered in the loop, to be cut through the material. Prior to cutting the hole, the sealing material is reinforced with material applied over the looped area of the internal riser link. The external riser link is attached to the harness on one end and connects to the internal riser link on the other end as described below.

The external riser link comprises a webbing strap attached to the parachute harness at one end. The external riser link may be permanently fixed to the harness or may be removably attached, i.e., the external riser link may be detached from the harness if desired. The other end of the webbing strap is fed through the looped end of the internal loop and the end is secured to a middle section of the webbing strap using attachment hardware.

In a preferred embodiment, the external riser link further comprises a webbing loop, a cord loop, an anchor loop, and a removable fastener. The webbing loop is threaded through the environmental envelope and looped end of the internal riser link. The cord loop is then passed through the webbing loop and connected to the anchor loop with the removable fastener. The removable fastener used on the external riser link permits easy connection or disconnection of the external riser link to the internal riser link.

It is an object of the present invention to enhance the canopy suspension line to harness interface that is used for environmentally sealed parachutes. This significantly increases the environmentally sealed parachute repack cycle from the present cycle of about five and a half years or less to up to seven years or longer, by devising a enhancing the environmentally sealed that inhibits aging of the parachute.

It is another object of the present invention to enhance the environmental sealing or vacuum sealing for all types of parachutes, including but not limited to, emergency bail-out, ejection seat, space vehicle recovery, cargo delivery, and sport reserve parachutes.

It is another object of the present invention to provide a linkage system enhancing the environmental or vacuum sealing of parachutes having varied design shapes, including but not limited to, conventional round, parafoil/ram-air, ribbon, or cruciform parachutes.

It is another of the present invention to provide a flexible linkage system for connecting a parachute riser to the parachute harness wherein the parachute and parachute riser a completely enclosed within an environmentally sealed envelope.

It is another object of the present invention to extend the life of an environmentally sealed parachute by providing a flexible linkage system that does not wear or damage the environmental sealing enclosing the parachute.

It is another object of the present invention to provide a strong but flexible linkage system for between a parachute riser and a parachute harness.

It is another object of the present invention to provide a simple to use flexible linkage system for connecting a parachute riser to a parachute harness.

These and other objects of the present invention will be apparent from the description and the accompanying drawings of a preferred embodiment of the present invention.

DESCRIPTION OF THE DRAWINGS

FIG. 2b is another view of the internal riser link shown in FIG. 2a.

FIG. 3b is another view of the external riser link shown in FIG. 3a.

DETAILED DESCRIPTION OF THE INVENTION

Figure 1:
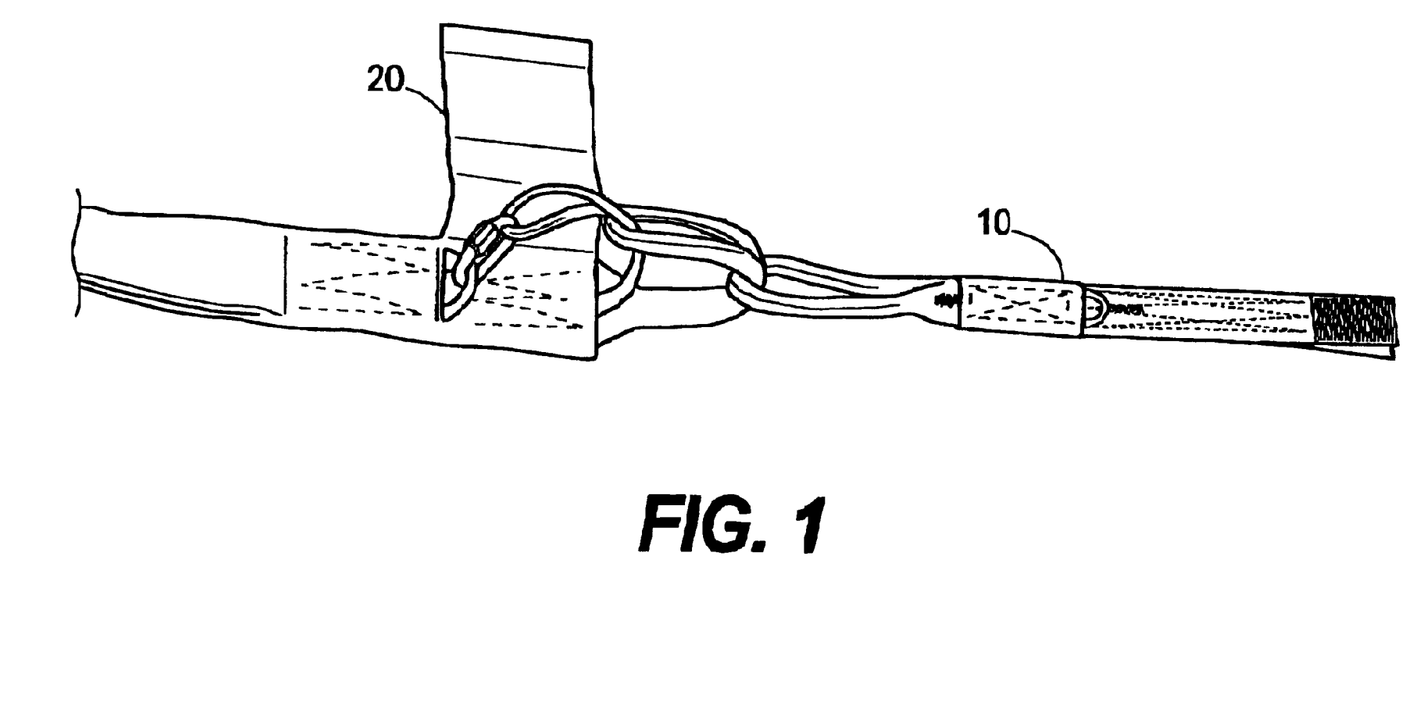
FIG. 1 is a schematic drawing of a preferred embodiment of a flexible linkage system of the present invention wherein the internal riser link is exposed to show how the external riser link connects to the internal riser link.

The present invention provides a flexible and structural linkage system for connecting an environmentally sealed apparatus, such as a parachute, to an external apparatus, such as a parachute harness. FIG. 1 shows the basic components comprising the flexible linkage system of the present invention: As shown in FIG. 1, internal riser link 10 connects to external riser link 20, which attaches to the parachute harness on the other end (not shown).

Figure 2A:
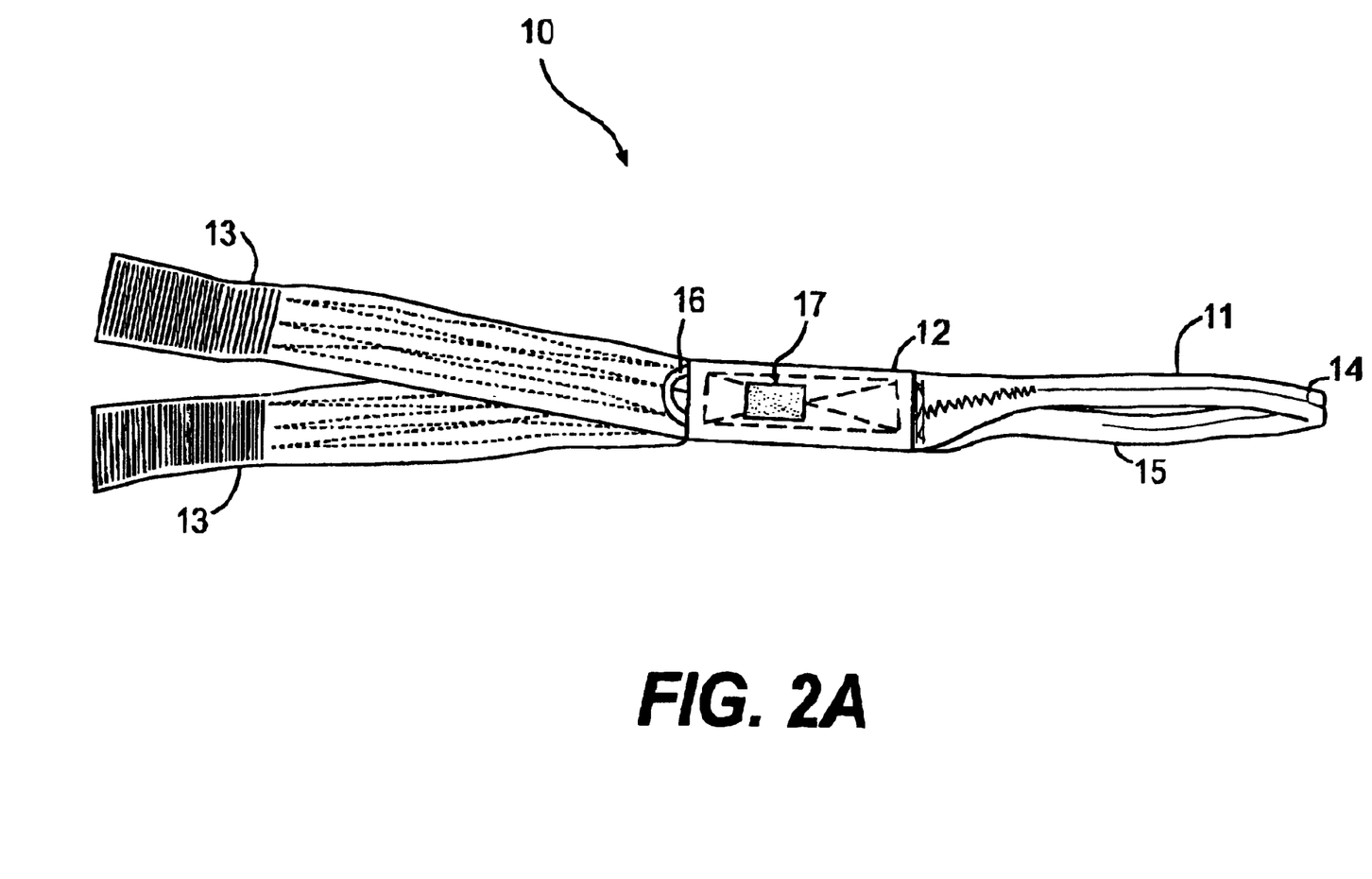
FIG. 2a is a schematic drawing of an internal riser link used in one embodiment of the present invention.
Figure 2B:
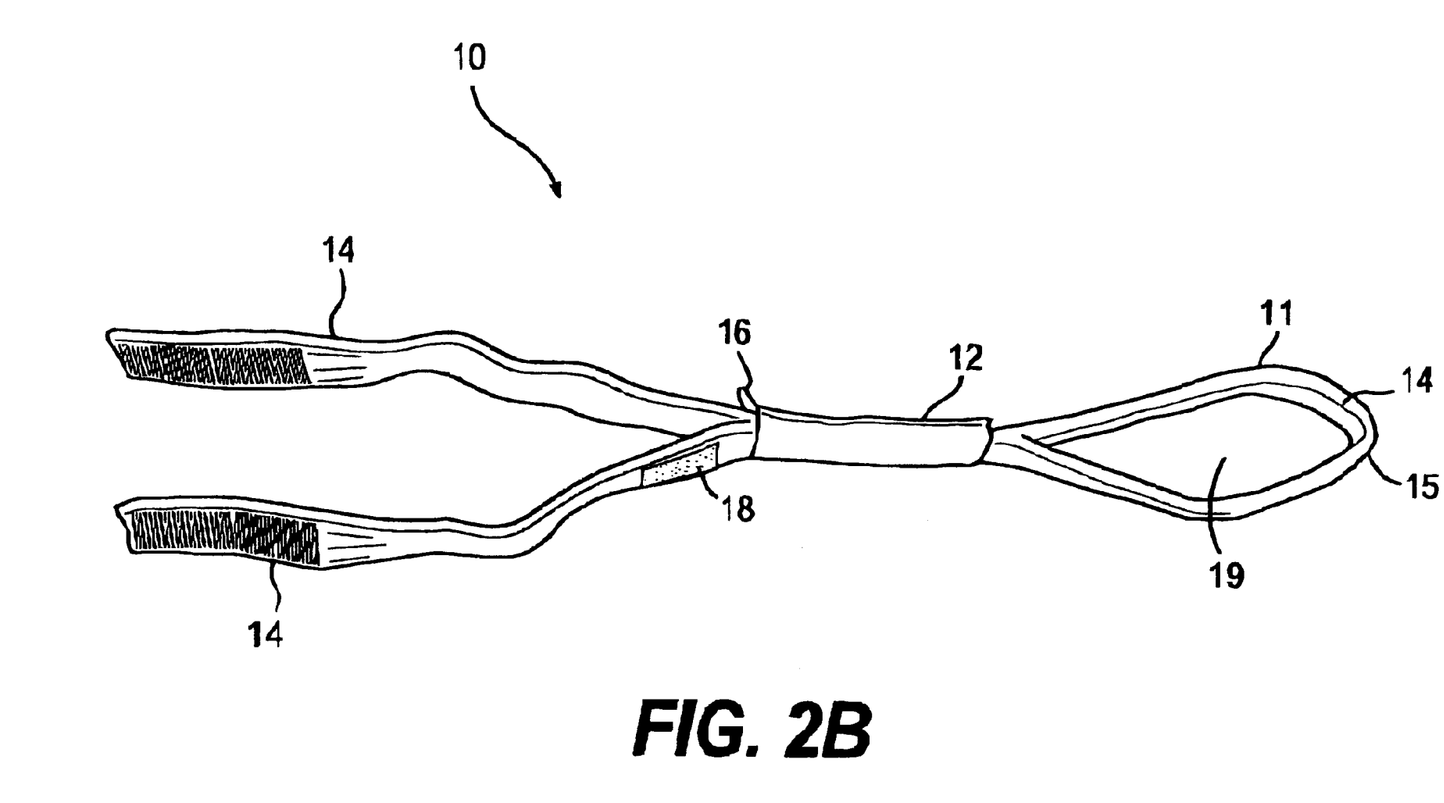
Figure 4:
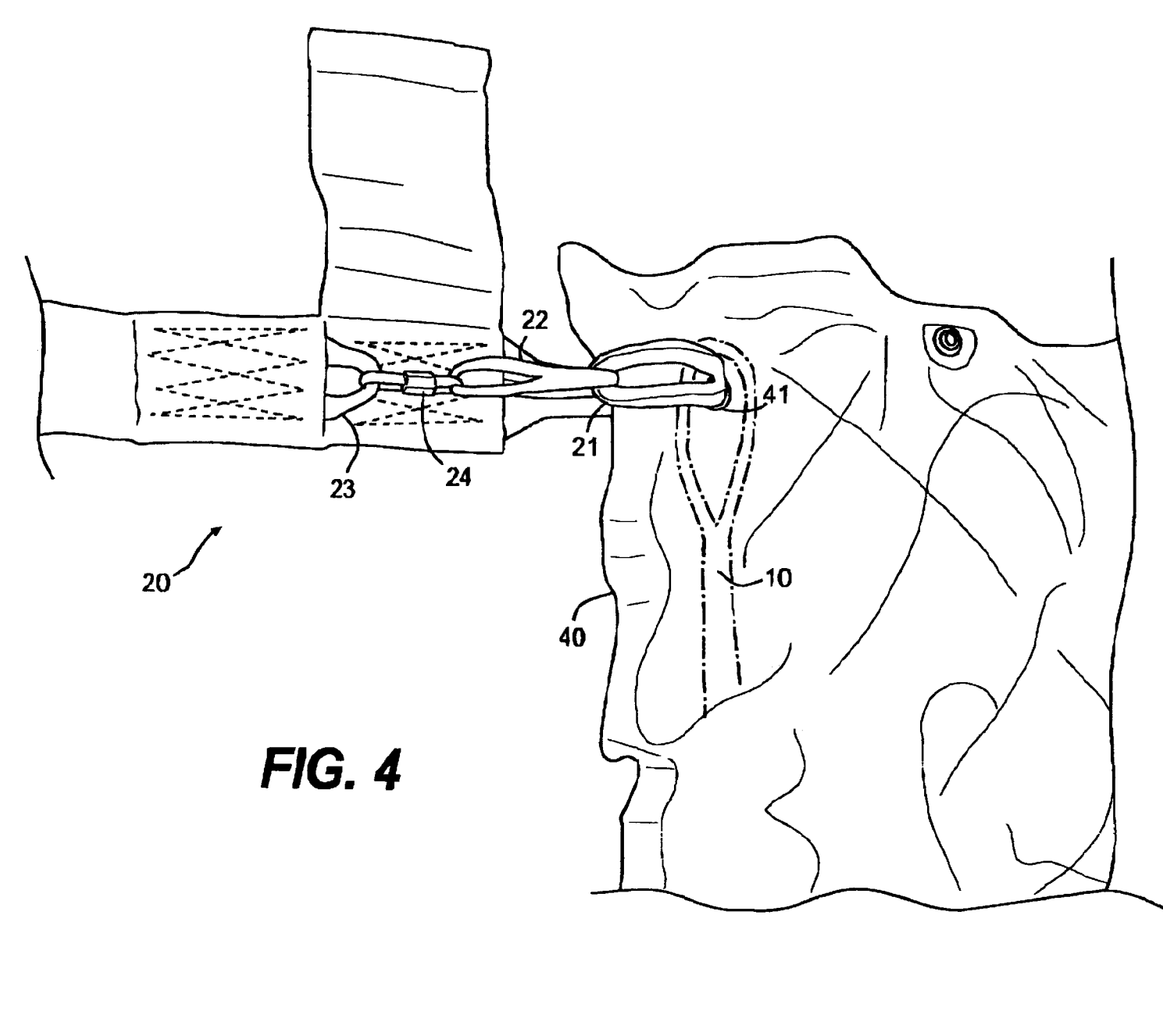
FIG. 4 is a schematic drawing showing a partial cut-away view of a flexible linkage system of the present invention connecting an environmentally sealed parachute system to an external riser link.

FIGS. 2a and 2b provide a more detailed drawing of a preferred embodiment of internal riser link 10. As shown in FIG. 2a, internal riser link 10 comprises flexible loop 11, confluence area 12 and suspension line attachment areas 13. Flexible loop 11 is joined to suspension line attachment areas 13 at confluence area 12. As would be apparent to one of ordinary skill in the art, flexible loop 11, confluence area 12 and suspension line attachment areas 13 could comprise a unitary material or could comprise multiple materials attached to one another using any suitable methods, such as, for example, sewing, gluing, stapling, and the like. In a preferred embodiment, flexible loop 11 and suspension line attachment areas 13 are stitched to each other and to material forming confluence area 12, using a high strength thread. In another preferred embodiment, flexible loop 11 comprises a reinforcement cord 14 within main loop enclosure 15 as shown in FIG. 2b. Parachute control accessories such as steering guide 16, steering handle attachment point 17, and deployment bag attachment point 18 may be added to internal riser link 10 as shown in FIGS. 2a and 2b. FIG. 2b is side view of the internal riser link shown in FIG. 2a. Center area 19 of flexible loop 11, shown in FIG. 2b, is sufficiently large to allow external riser link 20 to be connected to internal riser link 10 as shown in FIG. 1. Also, as shown in FIG. 4, center area 19 must be large enough to allow environmental barrier 40 to remain sealed around flexible loop 11.

Figure 3A:
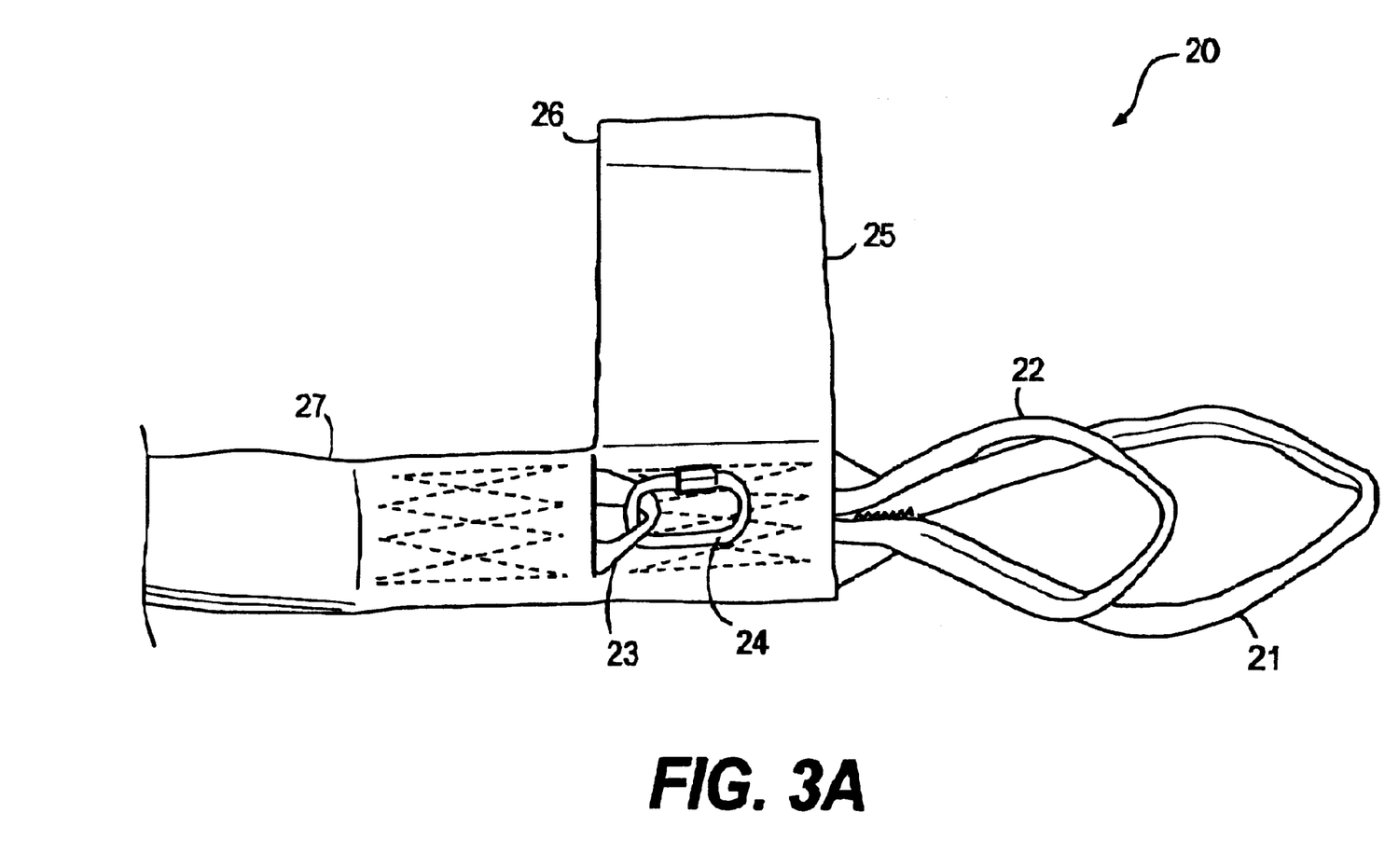
FIG. 3a is a schematic drawing of an external riser link used in one embodiment of the present invention.
Figure 3B:
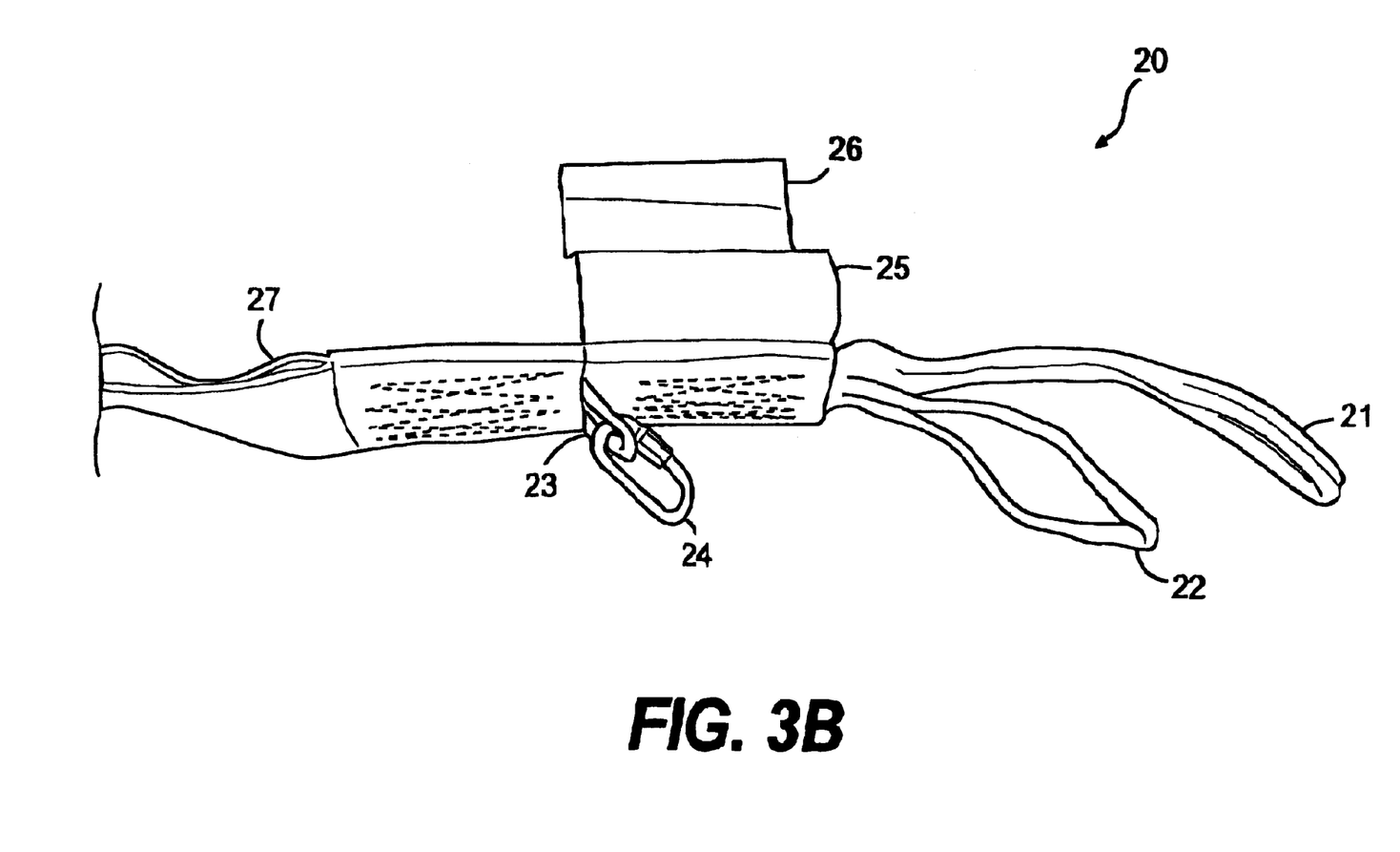

FIGS. 3a and 3b show a schematic diagram of a preferred embodiment of external riser link 20. As shown in FIG. 3a, external riser link 20 comprises main loop 21, secondary loop 22, anchor loop 23, and removable fastener 24. In this embodiment, the tip of main loop 21 is threaded through flexible loop 11 on internal riser link 10 and folded back toward the mid-section of the link as shown in FIG. 4. Secondary loop 22 is then passed through main loop 21 and folded back to connect to anchor loop 23 using removable fastener 24, as shown in FIG. 4. Removable fastener 24 is a hardware connector permitting easy connection or disconnection of the external riser link to the internal riser link. End 27 of external riser link 20 is attached to the parachute harness (no shown). Using the flexible linkage system of the present invention, the sealed parachute can be removably connected to the harness without forces applied to external riser link being transferred to the interior of the sealed package.

In an alternative embodiment, external riser link 20 further comprises flap 25 and fastener 26 providing added protection to the area where external link 20 is connected to internal link 10. Flap 25 wraps around external riser link 20, thereby covering anchor loop 23, removable fastener 24 and all of most of cord loop 22. Fastener 26 is used to secure flap 25 in place around external riser link 20. Fastener 26 comprises any suitable fastener system, for example, a hook and loop fastener (Velcro) can be used.

The back and front of environmental bag 40 are sealed together in the area around flexible loop 11, including center area 15. Hole 41 is cut or punched through environmental barrier 40 inside flexible loop 11. Main loop 21 is inserted through hole 41 and connected to secondary loop 22 as shown in FIG. 4. In a preferred embodiment, reinforcement material can be applied over environmental barrier 40 in the area covering center area 15. The reinforcement material may comprise any material providing increased strength to this portion of environmental barrier 40 without significantly increasing the rigidity of the package. Examples of suitable materials for the reinforcement material include adhesive backed fiber-reinforced tape, or other such material bonded or otherwise attached to environmental barrier 40. In this embodiment, hole 41 is made after the reinforcement material has been applied.

The present invention maintains the seal integrity of an environmentally sealed parachute while providing the structural load path that supports the person or other payload during deployment of the parachute. The flexible linkage system significantly enhances the durability of an environmentally sealed parachute because forces applied to the external riser link do not readily transfer to the internal riser link and environmental packaging enclosing the parachute. Accordingly, although the environmental package may be formed of pliable multi-layer materials that are susceptible to fatigue, the flexible linkage system reduces the transfer of handling forces transmitted through the parachute harness, risers, or other interface hardware. Because the linkage system of the present invention is flexible, damage to the environmental package due to bending and compression forces applied to the parachute harness are minimized.

The internal and external riser links, when connected together, provide a structural path to support the parachute opening loads. Both the internal riser link and the external riser link can be fabricated of textile materials providing significant flexibility which prevents bending and fatigue of the environmental or vacuum package. Such textile material must have high strength and low tenacity to provide sufficient flexibility without being susceptible to damage. In a preferred embodiment, the internal and external riser links are fabricated primarily of SPECTRA™ (available from Honeywell Performance Fibers, Colonial Heights, Va.). This material is effective because of its physical properties, such as its high strength-to-weight ratio, high tenacity, low coefficient of friction, and low abrasive properties. Other materials that exhibit similar properties, especially a resistance to self-inflicted damage (e.g., due to self-abrasion), are suitable alternatives.

In a preferred embodiment, removable fastener 24 is a hardware link known as Rapide Link, (Stainless Steel Size No. 4, available from Wichard Inc., Portsmouth, R.I.).

Figure 5:
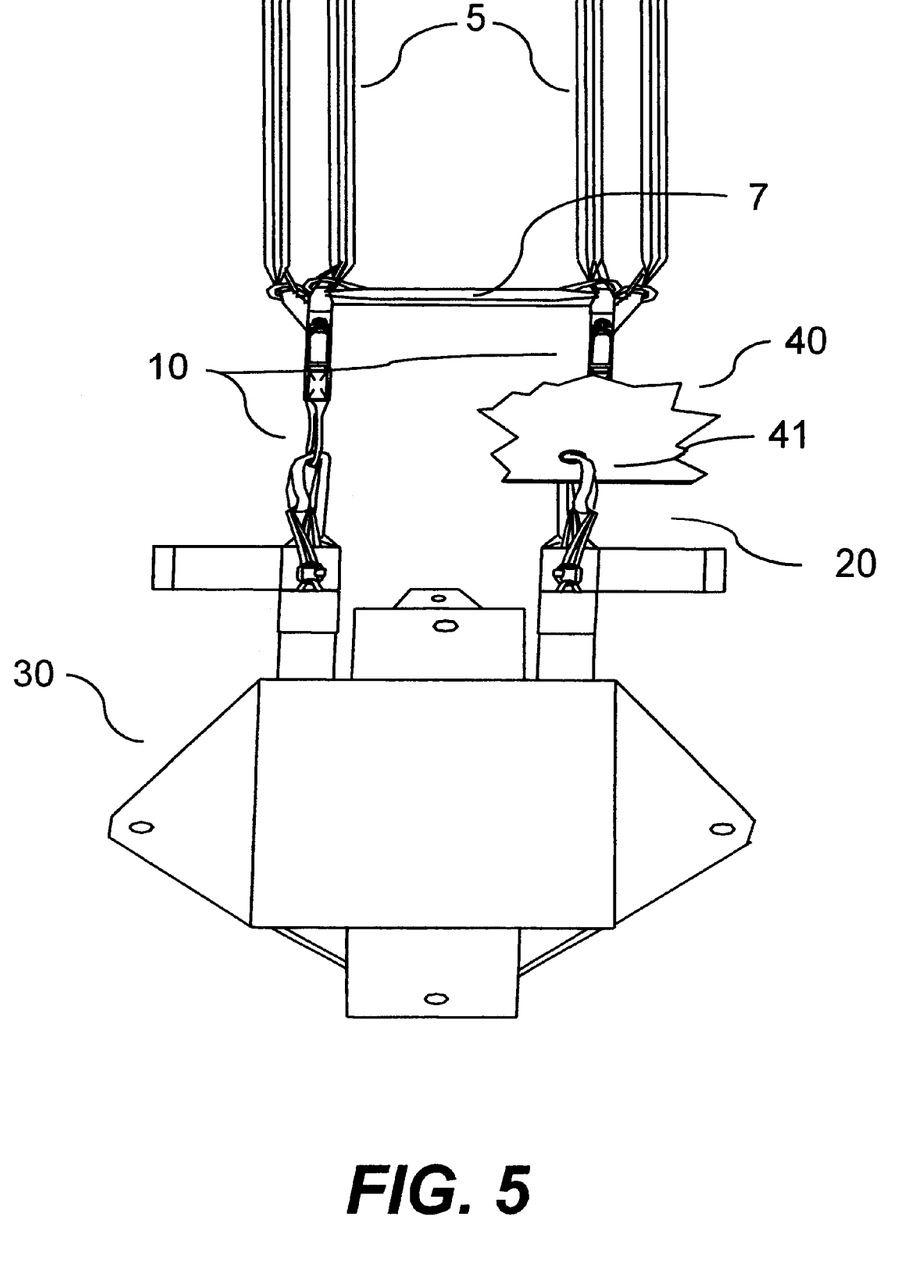
FIG. 5 is a schematic drawing showing a partial cut-away view of a flexible linkage system of the present invention connecting a parachute system to a parachute harness.

FIG. 5 shows a flexible linkage system of the present invention connecting an environmentally sealed parachute system to a parachute harness. Two sets of suspension lines 5 are shown, each connected to an internal riser link 10. Cross connectors 7 and suspension lines 5 are well-known components in parachute systems. Each internal riser link 10 is connected to an external riser link 20, and each external riser link 20 is connected to harness 30, as shown in FIG. 5. For clarity, FIG. 5 shows barrier material 40 covering only one of the internal riser links 10. However, it is to be understood that barrier material 40 completely encloses both of the internal riser links and the parachute system sealed within. External riser links 20 are connected to the internal riser links through hole 41, as shown in FIGS. 4 and 5.

As would be apparent to one of skill in the art, the present invention is not limited to parachute systems. That is, the flexible linkage system disclosed herein may be used with other apparatus wherein environmentally sealed packaging is important. For example, the internal link is attached to the sealed apparatus at one end and has an internal loop on the other end. The entire apparatus, including the internal link is sealed within the environmental packaging, and a hole is cut in the center of the internal loop as described above. The external link has an external loop at one end and a removable fastener anchored to a mid section of the link. The external loop is routed through the internal loop and the removable fastener removably connects the external loop to the external link. The other end of the external loop may be securely attached to an anchoring apparatus (external to the environmental seal) thereby providing a system for connecting and disconnecting the sealed apparatus from the anchor apparatus.

One example of an alternative apparatus wherein the flexible linkage system of the present invention may be beneficially utilized is an inflatable emergency escape slide (sealed apparatus) used for rapid evacuation of large aircraft (anchoring apparatus). Such escape slides must be anchored to the aircraft to support the upper end of the slide upon deployment. It is known in the art that such escape slides can be environmentally sealed to preserve their life cycle, fir the reasons discussed herein with respect to parachutes. As discussed above, if the integrity of the environmental seal is breached, the life cycle of the contents will be shortened. Accordingly, the present invention can be adapted to provide a flexible linkage system for connecting an environmentally sealed escape slide to an aircraft.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What I claim is:

1. A flexible linkage system for removably connecting an environmentally sealed apparatus to an external apparatus, said flexible linkage system comprising:
   (a) a flexible internal link attachable at a first end to the environmentally sealed apparatus, said flexible internal link comprising an internal loop at a second end; and
   (b) a flexible external link comprising an external loop at a third end and a removable fastener anchored to a mid-section of the external link, wherein said flexible external link is attachable to the external apparatus at a fourth end, and wherein the external loop is routed through the internal loop and removably connected to the removable fastener.

2. The system of claim 1, wherein the flexible external link is removably attached to the external apparatus at a fourth end.

3. The system of claim 1, wherein the flexible external link is fixedly attached to the external apparatus at a fourth end.

4. The system of claim 1, wherein the internal flexible link comprises a fabricated textile material.

5. The system of claim 1, wherein the external flexible material comprises a fabricated textile material.

6. The system of claim 1, further comprising an anchor loop fixedly attached to the mid-section of flexible external link, and wherein the removable fastener is anchored to the external flexible link by connecting the removable fastener to the anchor loop.

7. The system of claim 6, further comprising a cord loop fixedly attached to the third end of the flexible external link, and wherein the cord loop is routed through the external loop and is connected to the removable fastener thereby removably connecting the external loop to the removable fastener.

8. The system of claim 1, wherein the internal apparatus is a parachute system and the external apparatus is a parachute harness.

9. The system of claim 1, wherein the internal apparatus is a plurality of suspension lines of a parachute system and the external apparatus is a parachute harness.

10. The system of claim 1, wherein the internal apparatus is an emergency escape slide and the external apparatus is an aircraft.

11. The system of claim 1, further comprises a flap connected to the mid-section of the flexible external link, wherein said flap can be wrapped around said external link covering the connecting between the removable fastener and the internal loop.

12. The system of claim 10, further comprising a seal on an edge the flap, said seal removably sealing the flap around the flexible external link.

13. The system of claim 1, wherein the internal loop further comprises a plurality of loops.

14. The system of claim 1, wherein the flexible internal link comprises a material resistant to self-inflicted damage.

15. The system of claim 1, wherein the flexible external link comprises a material resistant to self-inflicted damage.

16. The system of claim 1, wherein the removable fastener comprises an oval hardware link including including a means for opening and closing the link.

17. A system comprising:
(a) an environmentally sealed apparatus;
(b) an external apparatus cabable of being flexibly connected to the environmentally sealed apparatus;
(c) a flexible internal link fixedly attached at a first end to the environmentally sealed apparatus, said flexible internal link comprising at least one internal loop at a second end; and
(d) a flexible external link comprising at least one external loop at a third end and a hardware connector anchored to a mid-section of the external link, wherein a tip of the at least one external loop is routed through a center of the at least one internal loop and folded back toward the mid-section of the flexible external link and is removably connected to the hardware link.

18. The system of claim 17, wherein the flexible external link is removably attached to the external apparatus at a fourth end.

19. The system of claim 17, wherein the flexible external link is fixedly attached to the external apparatus at a fourth end.

20. The system of claim 17, wherein the internal flexible link comprises a fabricated textile material.

21. The system of claim 17, wherein the external flexible material comprises a fabricated textile material.

22. The system of claim 17, further comprising an anchor loop fixedly attached to the mid-section of flexible external link, and wherein the hardware connector is anchored to the external flexible link by connecting the hardware connector to the anchor loop.

23. The system of claim 22, further comprising a cord loop fixedly attached to the third end of the flexible external link, and wherein a tip of the cord loop is routed through a center of the at least one external loop and folded back toward the mid-section of the flexible external link and is connected to the hardware connector thereby removably connecting the tip of the external loop to the hardware connector.

24. The system of claim 17, wherein the internal apparatus is a parachute system and the external apparatus is a parachute harness.

25. The system of claim 17, wherein the internal apparatus is a plurality of suspension lines of a parachute system and the external apparatus is a parachute harness.

26. The system of claim 17, wherein the internal apparatus is an emergency escape slide.

27. The system of claim 17, further comprises a flap connected to the mid-section of the flexible external link, wherein said flap can be wrapped around said external link covering the connecting between the removable fastener and the internal loop.

28. The system of claim 27, further comprising a seal on an edge the flap, said seal removably sealing the flap around the flexible external link.

29. The system of claim 17, wherein the at least one internal loop further comprises a plurality of loops.

30. The system of claim 17, wherein the flexible internal link comprises a material resistant to self-inflicted damage.

31. The system of claim 17, wherein the flexible external link comprises a material to self-inflicted damage.

32. The system of claim 17, wherein the hardware connector comprises an oval hardware link including including a means for opening and closing the link.

33. A parachute system comprising:
(a) a parachute enclosed in an environmentally sealed package;
(b) a harness external to the environmentally sealed package;
(c) a first flexible link having a first end attached to the parachute, said first flexible link comprising an internal loop at a second end; and
(d) a second flexible link having a first end attached to the harness, said second flexible link comprising an external loop at a second end and a removable fastener attached to a mid-section,
wherein the external loop is routed though the internal loop and removably connected to the removable fastener.

34. The system of claim 33, wherein the first flexible link comprises a material resistant to self-inflicted damage.

35. The system of claim 33, wherein the second flexible link comprises a material resistant to self-inflicted damage.

36. A safety system comprising:
(a) a safety apparatus having an internal portion and an external portion;
(b) an environmentally sealed package, wherein said internal portion of said safety apparatus is enclosed in said environmentally sealed package, and said external portion of said safety apparatus is external to said environmentally sealed package;
(c) an internal flexible link attached at one end to the internal portion of said safety apparatus, and having an internal loop at its other end; and
(d) an external flexible link attached at one end to the external portion of said safety apparatus, said external flexible link having an external loop at its other end,
wherein said flexible external link is routed through the internal loop.

37. The safety system of claim 36, wherein said flexible external link is removably connected to a removable fastener.

* * * * *

UNITED STATES PATENT AND TRADEMARK OFFICE
CERTIFICATE OF CORRECTION

PATENT NO. : 6,382,564 B1
DATED : May 7, 2002
INVENTOR(S) : Sego, Jr.

It is certified that error appears in the above-identified patent and that said Letters Patent is hereby corrected as shown below:

Column 1,
Line 32, "ripcord or some other means" should read -- ripcord, or when some other means --
Line 34, "pilot chute" should read -- pilotchute --

Column 2,
Line 10, "interfaces" should read -- interface --
Line 67, after "environmental envelope and" insert -- the --

Column 3,
Line 9, "parachute" should read -- parachutes --
Lines 11-12, "devising a enhancing the enviornmentally sealed" should read -- devising a means of enhancing the environmental sealing --
Line 23, after "It is another" insert -- object --
Line 26, "a completely" should read -- are completely --
Line 35, delete "for" between "system" and "between"

Column 4,
Line 27, "is side view" should read -- is a side view --
Line 47, "(no shown)" should read -- (not shown) --
Line 57, "all of most" should read -- all or most --

Signed and Sealed this

First Day of October, 2002

Attest:

Attesting Officer

JAMES E. ROGAN
Director of the United States Patent and Trademark Office